United States Patent
Ham

(10) Patent No.: US 8,525,775 B2
(45) Date of Patent: Sep. 3, 2013

(54) LIQUID CRYSTAL DISPLAY WITH LIGHT SHUTTER AND METHOD FOR DRIVING THE SAME

(75) Inventor: Yong Sung Ham, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 127 days.

(21) Appl. No.: 10/015,679

(22) Filed: Dec. 17, 2001

(65) Prior Publication Data
US 2002/0175886 A1    Nov. 28, 2002

(30) Foreign Application Priority Data
May 25, 2001    (KR) .......................... 10-2001-0028907

(51) Int. Cl.
*G09G 3/34*    (2006.01)
(52) U.S. Cl.
USPC ........................................... 345/108
(58) Field of Classification Search
USPC .............. 349/16, 74, 75, 76, 77, 196, 197, 349/200, 202, 78; 359/196, 197, 230; 348/56; 345/204, 58, 4–6, 85–108
See application file for complete search history.

(56) References Cited

U.S. PATENT DOCUMENTS

| | | | | |
|---|---|---|---|---|
| 4,097,128 | A | * | 6/1978 | Matsumoto et al. ............ 349/78 |
| 4,413,256 | A | * | 11/1983 | Yasuda et al. ................... 345/96 |
| 4,926,168 | A | * | 5/1990 | Yamamoto et al. ............. 345/58 |
| 5,495,265 | A | | 2/1996 | Hartman et al. ................ 345/87 |
| 5,583,674 | A | * | 12/1996 | Mosley .......................... 349/77 |
| 6,046,754 | A | * | 4/2000 | Stanek .......................... 345/169 |
| 6,417,895 | B1 | * | 7/2002 | Tabata et al. ................... 349/15 |
| 6,535,194 | B1 | * | 3/2003 | Hanano et al. ................. 345/101 |
| 6,590,605 | B1 | * | 7/2003 | Eichenlaub .................... 348/51 |
| 6,593,985 | B1 | * | 7/2003 | Taira et al. ..................... 349/119 |

FOREIGN PATENT DOCUMENTS

| | | |
|---|---|---|
| JP | S62-147434 A | 7/1987 |
| JP | 2-232623 | 9/1990 |
| JP | H03-096696 | 10/1991 |
| JP | 3-284791 | 12/1991 |
| JP | H09-325715 | 12/1997 |
| JP | 2001-117067 | 4/2001 |
| KR | 10-2001-0039573 | 5/2001 |
| WO | WO99/05567 | 2/1999 |

\* cited by examiner

*Primary Examiner* — Rodney Amadiz
(74) *Attorney, Agent, or Firm* — McKenna Long & Aldridge LLP

(57) ABSTRACT

The present invention discloses a liquid crystal display device with a light shutter to eliminate a motion-blurring phenomenon generated upon displaying a moving picture, thereby improving a display quality. In the liquid crystal display device, a light shutter is provided on a liquid crystal display panel for displaying an image to transmit or shut off the light from the liquid crystal display panel.

14 Claims, 7 Drawing Sheets

EXISTENT DATA SIGNAL

NODULATED DATA SIGNAL

REGION RESULTING IN
BLACK STATE IN NB MODE

LIQUID CRYSTAL DISPLAY WITH LIGHT SHUTTER AND METHOD FOR DRIVING THE SAME

This application claims the benefit of Korean Application No. P2001-28907 filed on May 25, 2001, which is hereby incorporated by reference.

BACKGROUND OF THE INVENTION

1. Field of the Invention

The present invention relates to a liquid crystal display, and more particularly, to a liquid crystal display with a light shutter and a method for driving the same. Although the present invention is suitable for a wide scope of applications, it is particularly suitable for improving a display quality by eliminating a motion-blurring.

2. Discussion of the Related Art

Generally, a liquid crystal display (LCD) of an active matrix driving system uses a thin film transistor (TFT) as a switching device to display a moving picture. Since such an LCD can be fabricated into a smaller device than a conventional cathode ray tube (CRT), it has been widely used for a monitor for a personal computer or a notebook computer as well as office automation equipment such as a copy machine, etc. and portable equipment such as a cellular phone and a pager, etc.

However, the liquid crystal display has a problem of a motion-blurring that causes an overlapped or blurred field in a moving picture due to a response characteristic of a liquid crystal and a data delay. This will be described in conjunction with FIG. 1A and FIG. 1B representing data characteristics of a CRT and an LCD.

When the CRT and the LCD are operated at 60 Hz, one field period is approximately 16.7 ms corresponding to 1/60 second. The CRT radiates a fluorescent body only during an initial very short time of the one field period to display data while remaining at a pause interval during almost all other portions of the one field period as shown in FIG. 1A. Accordingly, an observer sees a display image of the CRT similar to a real image as shown in FIG. 1C without generating a motion-blurring from a moving picture.

On the other hand, in the liquid crystal display, as shown in FIG. 2, data are applied to a liquid crystal in a scanning interval supplied with a gate high voltage Vgh and data applied to the liquid crystal are maintained in a non-scanning interval that is a major portion of the one field period. Accordingly, the liquid crystal display generates a motion-blurring in a moving picture because each liquid crystal continuously displays an image without a pause interval during the one field period.

Recently, there has been an effort to include a pause interval in the liquid crystal display device similar to the CRT so as to reduce a motion-blurring in the liquid crystal display.

For instance, IBM corporation has suggested the scheme of blinking a backlight radiating continuously during the one field period as shown in FIG. 3B. However, this scheme has a problem yet to be resolved. Although the blinking of the backlight permits the pause interval corresponding to the time interval when the backlight is turned off as shown in FIG. 4 to reduce a motion-blurring, an additional control circuit for driving the backlight and a modification of the driving circuit are required. Moreover, brightness is more deteriorated in the direct current driving.

Sharp corporation has suggested the scheme of modulating an existent data having only a polarity inversion as shown in FIG. 5A into data shown in FIG. 5B to assign a time interval when data do not exist in one field period. This scheme allows black data having no data, so that no voltage is applied to the liquid crystal cell in a normally black mode liquid crystal display to include a pause interval within the one field period. However, such a method creates another problem in that a driving frequency according to a data on/off should be increased, for example, from 60 Hz to 120 Hz. As a result, a timing controller and a data driving circuit should be modified to reduce a data charge time in a high resolution.

SUMMARY OF THE INVENTION

Accordingly, the present invention is directed to a liquid crystal display with a light shutter and a method for driving the same that substantially obviates one or more of problems due to limitations and disadvantages of the related art.

Another object of the present invention is to provide a liquid crystal display with a light shutter and a method for driving the same that improves a display quality by eliminating a motion-blurring in a moving picture.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display panel displaying an image, and a light shutter on the liquid crystal display to transmit or shut off a light emitted from the liquid crystal display panel.

In the liquid crystal display device, the light shutter includes a liquid crystal between two glass substrates, and a plurality of electrodes provided on the two glass substrates to drive the liquid crystal.

The liquid crystal display device further includes a polarizer on at least one of glass substrates of the light shutter to transmit a linearly polarized light.

In the liquid crystal display device, the liquid crystal display panel and the light shutter are bonded to each other and have a polarizer therebetween. Alternatively, the liquid crystal display panel and the light shutter are bonded to a single glass substrate.

The liquid crystal display device further includes a backlight irradiating a light toward the liquid crystal display panel.

In another aspect of the present invention, an apparatus for driving a liquid crystal display includes a liquid crystal display panel displaying an image, a light shutter on the liquid crystal display to transmit or shut off a light emitted from the liquid crystal display panel, a controller generating a shutter control signal to open or close the light shutter, and a light shutter driver responding to the shutter control signal to drive the light shutter.

In the apparatus, the shutter control signal has an inverse polarity after video data having an inverse polarity are applied to the liquid crystal display panel. The shutter control signal is a pulse signal having a first logical value turning on the light shutter and a second logical value turning off the light shutter.

The apparatus further includes a data driver connected to a plurality of data lines of the liquid crystal display panel to apply video data to the data lines, and a gate driver connected to a plurality of gate lines of the liquid crystal display panel to apply a scanning signal to the gate lines.

In the driving apparatus, the data driver is connected to the controller that generates the video data and a dot clock, and controls the data driver, and the gate driver is connected to the controller that generates a gate start pulse allowing the scanning signal to be sequentially generated, and controls the gate driver.

In the driving apparatus, the shutter control signal has a first logical value in an initial field interval when video data are applied to the liquid crystal display panel, and has a second logical value in a time interval when the video data are maintained at the liquid crystal display panel.

In a further aspect of the present invention, a method of driving a liquid crystal display having a light shutter on a liquid crystal display panel includes supplying video data to a liquid crystal display panel, and opening the light shutter in an initial interval applying the video data and closing the light shutter in a maintenance interval maintaining the video data to shut off a light from the liquid crystal display panel.

The driving method further includes applying a shutter control signal having a first logical value in an initial field interval when the video data are applied to the liquid crystal display panel and a second logical value in a time interval when the video data are maintained at the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIG. 3A is a graph showing a scheme in which a backlight is continuously turned on;

FIG. 3B is a graph showing a scheme in which the backlight is periodically turned on;

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1A:
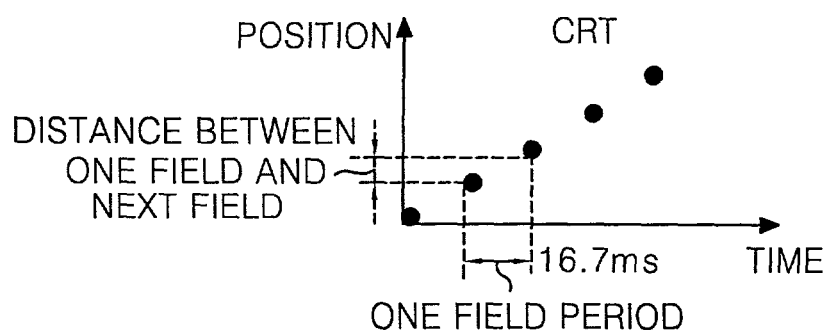
FIG. 1A is a graph showing a picture display of a CRT according to a distance between fields and a time lapse.
Figure 1B:
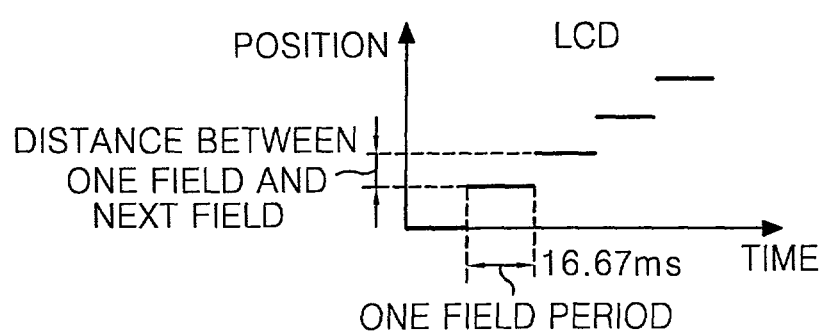
FIG. 1B is a graph showing the picture display of a liquid crystal display according to the distance between the fields and the time lapse.
Figure 1C:
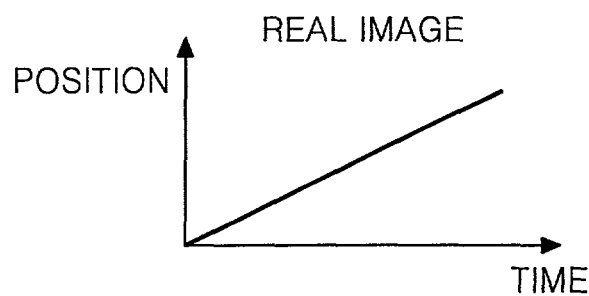
FIG. 1C is a graph showing a real image according to the distance between the fields and the time lapse.
Figure 2:
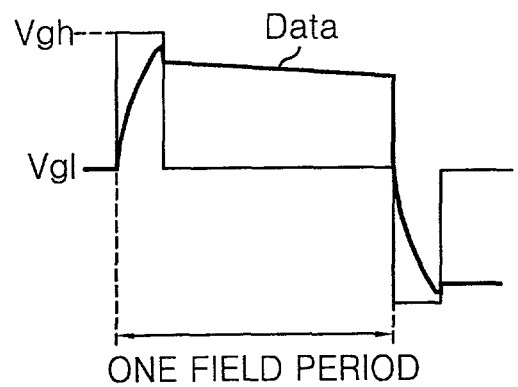
FIG. 2 is a waveform diagram of a gate pulse and data applied to a conventional liquid crystal display.
Figure 3A:
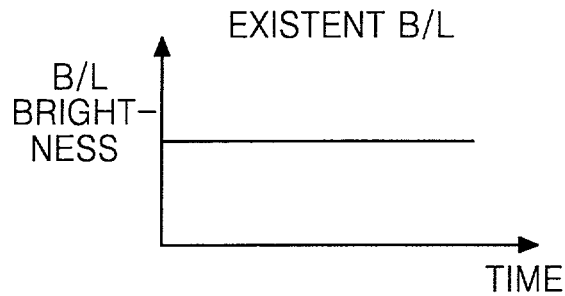
Figure 3B:
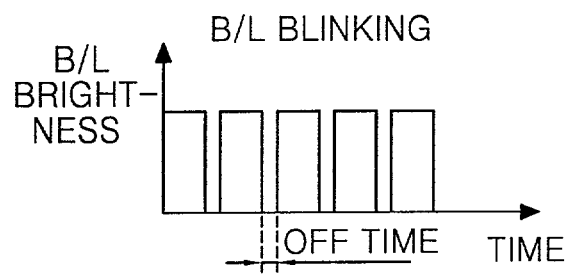
Figure 4:
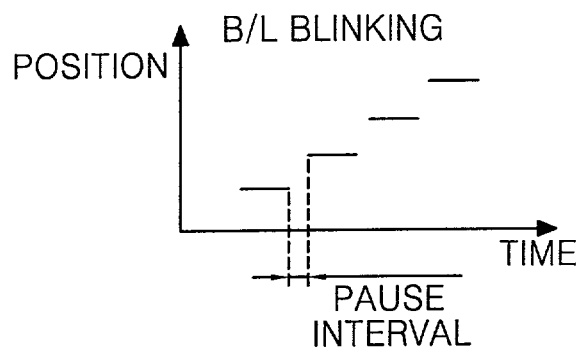
FIG. 4 is a graph showing a pause interval introduced into the conventional liquid crystal display when turning on the backlight and a data modulation.
Figure 5A:
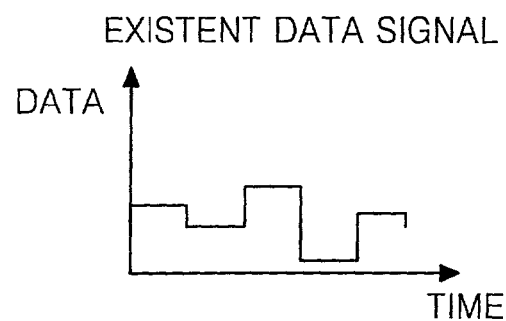
FIG. 5A is a graph showing a scheme in which video data are continuously applied to the liquid crystal display.
Figure 5B:
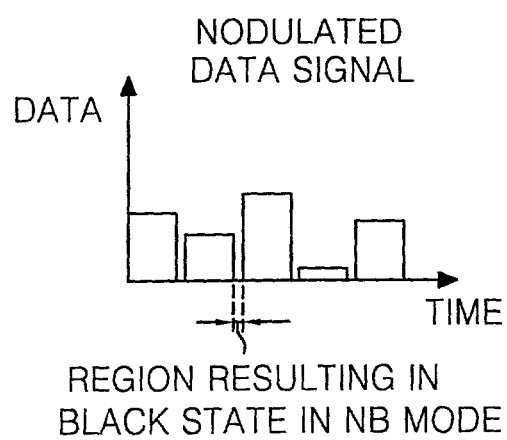
FIG. 5B is a graph showing a scheme of turning on or off the video data to apply to the liquid crystal display.
Figure 6:
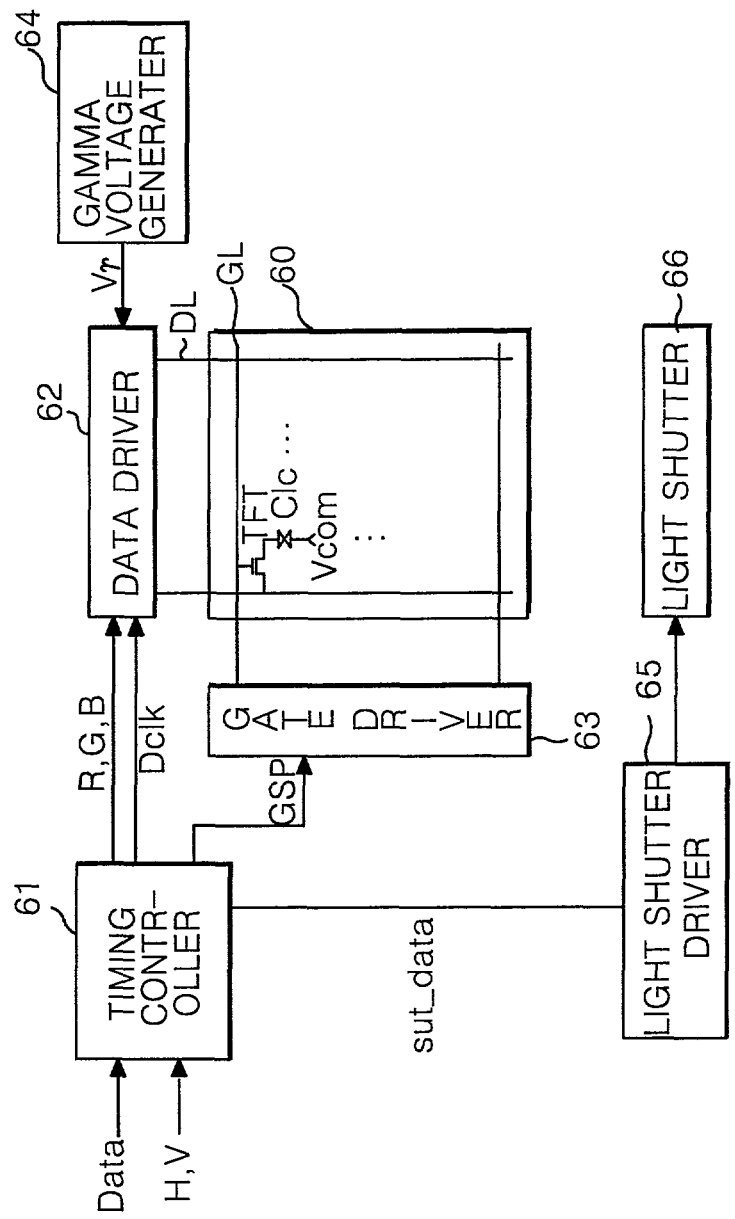
FIG. 6 is a block diagram showing a configuration of a driving apparatus for a liquid crystal display with a light shutter according to the present invention.

Referring to FIG. 6, a liquid crystal display device according to the present invention includes a data driver 62 applying video data to data lines DL of a liquid crystal display panel 60, a gate driver 63 sequentially driving gate lines GL of the liquid crystal display panel 60, a gamma voltage generator 64 applying a gamma voltage Vr to the data driver 62, a light shutter 66 selectively shutting off light emitting from the liquid crystal display panel 60, a light shutter driver 65 controlling the light shutter 66, and a timing controller 61 controlling the data driver 62, a gate driver 63 and the light shutter driver 65.

More specifically, the liquid crystal display panel 60 has a liquid crystal between two glass substrates and has the gate lines GL and the data lines DL arranged perpendicularly to each other on the lower glass substrate. Each intersection between the gate lines GL and the data lines DL is provided with a thin film transistor (TFT) for selectively supplying an image inputted from the data lines DL to a liquid crystal cell Clc. To this end, the TFT has a gate terminal connected to each gate line GL and a source terminal connected to each data line DL. A drain terminal of the TFT is connected to a pixel electrode of the liquid crystal cell Clc.

The timing controller 61 separates the data inputted from a digital video card (not shown) into red(R), green(G), and blue(B) video data and applies to the data driver 62. Further, the timing controller 61 generates a dot clock Dclk and a gate start pulse GSP with the aid of horizontal/vertical synchronizing signals H and V to carry out a timing control of the data driver 62 and the gate driver 63. The dot clock Dclk is applied to the data driver 62 while the gate start pulse GSP is applied to the gate driver 63. Also, the timing controller 61 controls the light shutter driver 65 to turn on or off the light shutter 66.

The dot clock Dclk, along with R, G, and B digital video data, as shown in FIG. 6, from the timing controller 61 is inputted to the data driver 62. The data driver 62 latches the R, G, and B digital video data in synchronization with the dot clock Dclk and thereafter corrects the latched data in accordance with a gamma voltage Vr. Also, the data driver 62 inverts a polarity of the data corrected by the gamma voltage Vr every field and converts the data into analog data, thereby applying to the data lines DL line by line.

Figure 7:
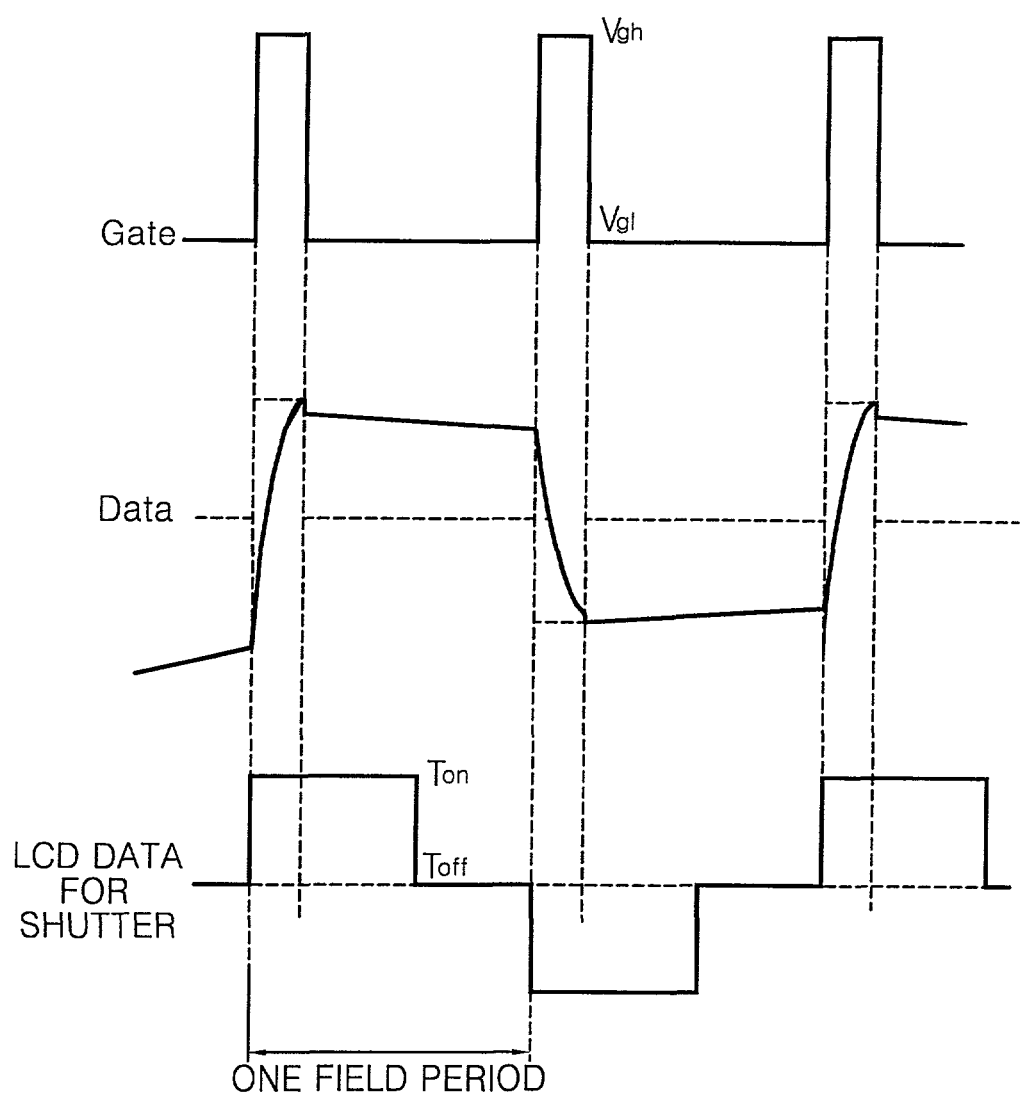
FIG. 7 is a driving waveform diagram of the driving apparatus for the liquid crystal display shown in FIG. 6.

The gate driver 63 includes a shift register for responding to the gate start pulse GSP inputted from the timing controller 61 to sequentially generate a scanning pulse, as shown in FIG. 7, and a level shifter (not shown) for shifting a voltage of the scanning pulse into a level suitable for driving the liquid crystal cell. Video data at the data line DL are applied to the pixel electrode of the liquid crystal cell Clc by turning on or turning off the TFT in response to the scanning pulse inputted from the gate driver 63.

The gamma voltage generator 64 plays a role to generate a gamma voltage Vr corresponding to a gray scale value of the data in consideration of electrical and optical characteristics of the liquid crystal display panel 60 to apply to the data driver 62.

The light shutter 66 is arranged on the light output surface of the liquid crystal display panel 60 to transmit or shut off the light emitting from the liquid crystal display panel 60. The light shutter 66 applies a voltage to the liquid crystal to differentiate a rotation of the liquid crystal, that is, a refractive index of the liquid crystal, thereby transmitting or shutting off the light from the liquid crystal display panel 60.

The light shutter driver 65 plays a role to drive the light shutter under the control of the timing controller 61. To this end, the light shutter driver 65 is supplied with light shutter data Sut_data that conform to a polarity of the data, as shown in FIG. 7, and have a high logic region for transmitting the light from the liquid crystal display panel 60 and a low logic region for shutting off the light from the liquid crystal display panel 60 for each field.

Figure 8:
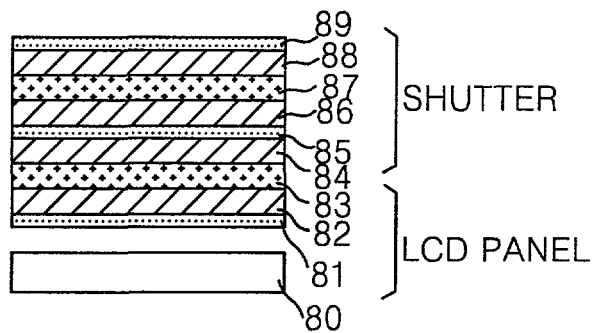
FIG. 8 is a cross-sectional view showing a structure of a liquid crystal display with a light shutter according to a first embodiment of the present invention.
Figure 9:
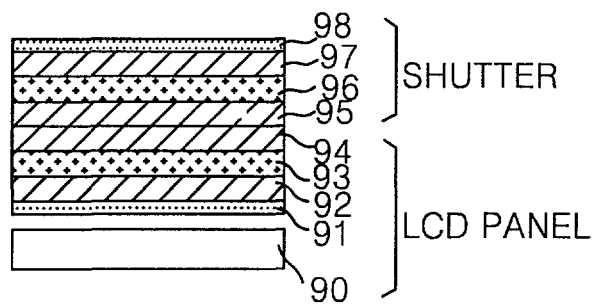
FIG. 9 is a cross-sectional view showing a structure of the liquid crystal display with a light shutter according to a second embodiment of the present invention.
Figure 10:
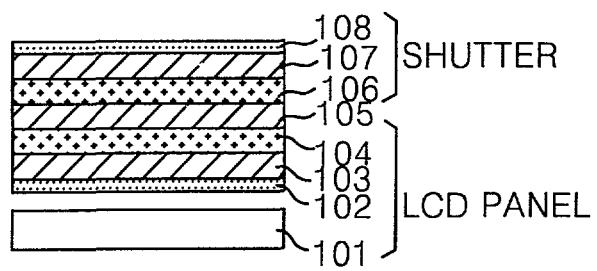
FIG. 10 is a cross-sectional view showing a structure of the liquid crystal display with a light shutter according to a third embodiment of the present invention.

FIG. 8 to FIG. 10 illustrate cross-sectional views for liquid crystal display panels and light shutters according to the present invention.

Initially referring to FIG. 8, a liquid crystal display panel with a light shutter according to a first embodiment of the present invention includes a liquid crystal display panel and a light shutter sharing the same polarizer 85.

More specifically, the liquid crystal display panel has a liquid crystal 83 between two glass substrates 82 and 84. The upper surface of the upper glass substrate 84 is attached to a polarizer 85 and the lower surface thereof is provided with black matrices, color filters, a common electrode and alignment films, etc (not shown). Further, the lower surface of the lower glass substrate 82 is attached to a polarizer 81 and the upper surface thereof is provided with gate electrodes, data electrodes, TFT's, pixel electrodes and alignment films, etc.

The light shutter has a liquid crystal 87 between two glass substrates 86 and 88, each of which is provided with an electrode for driving the liquid crystal 87. The light shutter data Sut_data from the timing controller 61 are inputted to any one of the electrodes formed at the glass substrates 86 and 88. A polarizer 89 is attached to the upper portion of the upper glass substrate 88. A liquid crystal display panel is bonded to the lower glass substrate 86. Thus, the polarizer 85 is positioned between the upper glass substrate 84 of the liquid crystal display panel and the lower glass substrate 86 of the light shutter. Thus, the polarizer 85 is shared by the shutter portion and the liquid crystal display panel portion.

Polarization directions of the polarizers 81, 85, and 89 can be different depending on a mode characteristic of the liquid crystal. For instance, assuming that each of the liquid crystals 83 and 87 of the liquid crystal display panel and the light shutter are a 90° TN mode and a polarization direction of the polarizer 81 attached to the lower glass substrate 82 of the liquid crystal display panel is a P linear-polarization direction, a polarization direction of the polarizer 85 between the liquid crystal display panel and the light shutter is an S linear-polarization direction. On the other hand, a polarization direction of the polarizer 89 attached onto the upper glass substrate 88 of the light shutter is the P linear-polarization direction.

When a power is applied to drive the liquid crystal display panel and the light shutter, the backlight 80 is turned on and data are supplied to the liquid crystal cell of the liquid crystal display panel. The light shutter transmits the light from the liquid crystal display panel at positive and negative high logic regions of the light shutter data Sut_data from the timing controller 61. When the data are maintained at the liquid crystal cell of the liquid crystal display panel, the light shutter shuts off the light from the liquid crystal display panel at a low logic region that has a ground level of the light shutter data Sut_data. Thus, the light is transmitted and is shut off within one field with the aid of the light shutter in this manner, so that a motion-blurring phenomenon caused by maintaining a display image in the previous field is eliminated.

A process of fabricating the liquid crystal display panel and the light shutter will be described below.

The process of fabricating the liquid crystal display panel and the light shutter is divided into substrate cleaning, substrate patterning, alignment film formation, substrate jointing/liquid crystal injection, and packaging processes.

In the substrate cleaning process, alien materials contaminating the surfaces of the substrates of the liquid crystal display panel and the light shutter are eliminated by a cleaner.

The substrate patterning process of the liquid crystal display panel is divided into the steps of patterning the upper substrate and patterning the lower substrate. The upper substrate of the liquid crystal display panel is provided with color filters, a common electrode, and a black matrix, etc. The lower substrate is provided with signal wires such as data lines and gate lines, etc. A thin film transistor (TFT) is arranged at each intersection between the data lines and the gate lines. A pixel electrode is formed at each pixel area between the data lines and the gate lines to be connected to a source electrode of the TFT.

In the substrate jointing/liquid crystal injection process of the liquid crystal display panel, the step of coating and rubbing an aligning film on the substrates of the liquid crystal display panel is sequentially followed by the step of joining the upper substrate to the lower substrate using a sealant, the liquid crystal injection step, and the injection hole sealing step.

In the packaging process of the liquid crystal display panel, a tape carrier package (TCP) mounted with integrated circuits, such as a gate driver integrated circuit and a data driver integrated circuit, is connected to a pad portion on the substrate. Such driver integrated circuits may be directly packaged onto the substrate by a chip on glass (COG) system rather than a tape automated bonding (TAB) system using the above-mentioned TCP.

In the substrate patterning process of the light shutter, the step of depositing a transparent conductive electrode material, for example, indium tin oxide and the step of patterning the electrode material are included to provide an electrode supplied with shutter data Sut_data.

In the substrate jointing/liquid crystal injection process of the light shutter, the step of coating and rubbing an aligning film on the substrates of the liquid crystal display panel, the step of joining the upper substrate to the lower substrate using a sealant, the step of injecting a liquid crystal, and the step of sealing an injection hole are sequentially performed in this order.

In the mean time, the liquid crystal display panel and the light shutter can be bonded with each other to share the polarizer 85 therebetween after completing each of the liquid crystal injection and sealing processes. Alternatively, the liquid crystal injection and sealing processes may be simultaneously performed after bonding the liquid crystal display and the light shutter.

Referring to FIG. 9, a liquid crystal display panel with a light shutter according to a second embodiment of the present invention includes a liquid crystal display panel and a light shutter in which a polarizer does not exist at the bonding surface thereof.

The liquid crystal display panel has a liquid crystal 93 between two glass substrates 92 and 94. The upper glass substrate 94 is not provided with a polarizer thereon, and the lower surface thereof is provided with black matrices, color filters, a common electrode, and alignment films (not shown).

The lower surface of the lower glass substrate 92 is attached with a polarizer 91 and the upper surface thereof is provided with gate electrodes, data electrodes, TFT's, pixel electrodes, and alignment films, etc.

The light shutter has a liquid crystal 96 between two glass substrates 95 and 97, each of which is provided with an electrode for driving the liquid crystal 96. The light shutter data Sut_data from the timing controller 61 are inputted to one of the electrodes formed at the glass substrates 95 and 97. A polarizer 98 is attached to the upper portion of the upper glass substrate 97. A liquid crystal display panel is bonded to the lower glass substrate 95. Thus, no polarizer exists between the upper glass substrate 94 of the liquid crystal display panel and the lower glass substrate 95 of the light shutter.

Polarization directions of the polarizers 91 and 98 may be different depending on a mode characteristic of the liquid crystal. For instance, assuming that each of the liquid crystals 93 and 96 of the liquid crystal display panel and the light shutter are a 90° TN mode and a polarization direction of the polarizer 91 attached to the lower glass substrate 92 of the liquid crystal display panel is a P linear-polarization direction, the P linear-polarized light is converted into an S linear-polarized light with the aid of the liquid crystal 93 of the liquid crystal display panel. Then, the S linear-polarized light is converted into the P linear-polarized light, so that a polarization direction of the polarizer 98 attached onto the upper glass substrate 97 of the light shutter 85 between the liquid crystal display panel and the light shutter is determined to be a P linear-polarization direction.

When a power is applied to drive the liquid crystal display panel and the light shutter, a backlight 90 is turned on and data are supplied to the liquid crystal cell of the liquid crystal display panel. The light shutter transmits the light emitted from the liquid crystal display panel at positive and negative high logic regions of the light shutter data Sut_data from the timing controller 61. When the data are maintained at the liquid crystal cell of the liquid crystal display panel, the light shutter shuts off the light from the liquid crystal display panel at a low logic region that has a ground level of the light shutter data Sut_data.

A process of fabricating the liquid crystal display panel and the light shutter includes the steps of substrate cleaning, substrate patterning, alignment formation, substrate jointing/liquid crystal injection, and packaging. The fabrication process is similar to that of the first embodiment, except that a polarizer is not provided between the liquid crystal display panel and the light shutter.

Referring to FIG. 10, a liquid crystal display panel with a light shutter according to a third embodiment of the present invention includes a liquid crystal display panel and a light shutter that are disposed with sharing a single glass substrate 105.

The light shutter is positioned at the upper portion of the glass substrate 105 while the liquid crystal display panel is positioned at the lower portion thereof.

The liquid crystal display panel has a liquid crystal 104 between the glass substrate 105 and a lower glass substrate 103. The lower surface of the glass substrate 105 is provided with black matrices, color filters, a common electrode, and alignment films (not shown). The lower surface of the lower glass substrate 103 is attached with a polarizer 102 and the upper surface thereof opposed to the glass substrate 105 is provided with gate electrodes, data electrodes, TFT's, pixel electrodes, and alignment films, etc.

The light shutter has a liquid crystal 106 between an upper glass substrate 107 and the glass substrate 105, each of which is provided with an electrode for driving the liquid crystal 106. The light shutter data Sut_data from the timing controller 61 are inputted to one of the electrodes formed at the upper glass substrate 107 and the glass substrate 105. A polarizer 108 is attached to the upper portion of the upper glass substrate 107.

Polarization directions of the polarizers 102 and 108 may be different depending on a mode characteristic of the liquid crystal, as discussed above.

When a power is applied to drive the liquid crystal display panel and the light shutter, a backlight 101 is turned on and the data are supplied to the liquid crystal cell of the liquid crystal display panel. The light shutter transmits the light emitted from the liquid crystal display panel at positive and negative high logic regions of the light shutter data Sut_data from the timing controller 61. When the data are maintained at the liquid crystal cell of the liquid crystal display panel, the light shutter shuts off the light from the liquid crystal display panel at a low logic region that has a ground level of the light shutter data Sut_data.

Similarly, a process of fabricating the liquid crystal display panel and the light shutter includes the steps of substrate cleaning, substrate-patterning, alignment formation, substrate jointing/liquid crystal injection, and packaging. The fabrication process is similar to that of the first embodiment, except that a polarizer is not provided between the liquid crystal display panel and the light shutter.

As described above, in the liquid crystal display according to the present invention, the light shutter for shutting off the light from the liquid crystal display panel when the data are maintained at the liquid crystal cell is provided at the liquid crystal display panel. Accordingly, a pause interval for not displaying an image between fields by opening or closing the light utilizing the light shutter is introduced to eliminate a motion-blurring phenomenon generated upon displaying a moving picture, thereby improving a display quality. Furthermore, the driving apparatus and method for the liquid crystal display according to the present invention includes the timing controller for driving the data driver and the gate driver and generating control data for opening and closing the light shutter to control the light shutter, so that it properly drives the liquid crystal display.

It will be apparent to those skilled in the art that various modifications and variations can be made in the liquid crystal display with light shutter and the method for driving the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
   a liquid crystal display panel having pixels, each pixel displaying an image data value; and
   a light shutter on the liquid crystal display panel operable to transmit and shut off all light emitted from the liquid crystal display panel during a field period,
   wherein the field period is initiated upon a first transition of a gate signal to apply the image data values to the pixels and is terminated upon a next transition of the gate signal to apply image data values to the pixels, wherein the field period corresponds to only one image data value at each pixel,
   and wherein the light shutter is switched to transmit all light emitted from the liquid crystal display panel at a first transition of the gate signal and the light shutter is switched to shut off the light emitted from the liquid crystal display panel after the first gate signal and before the next transition of the gate signal within the field period.

2. The liquid crystal display device according to claim 1, wherein the light shutter includes,
   a liquid crystal between two glass substrates, and
   a plurality of electrodes on the two glass substrates to drive the liquid crystal.

3. The liquid crystal display device according to claim 1, wherein the light shutter has a polarizer to transmit a linearly polarized light.

4. The liquid crystal display device according to claim 1, wherein the liquid crystal display panel and the light shutter are bonded with each other and have a polarizer therebetween.

5. The liquid crystal display device according to claim 1, wherein the liquid crystal display panel and the light shutter are bonded to a single glass substrate.

6. The liquid crystal display device according to claim 1, further comprising a backlight irradiating a light toward the liquid crystal display panel.

7. An apparatus for driving a liquid crystal display, comprising:
   a liquid crystal display panel having a pixel for displaying an image;
   a light shutter on the liquid crystal display panel operable to transmit and shut off all light emitted from the liquid crystal display panel during every field period;
   a controller generating a shutter control signal to open or close the light shutter; and
   a light shutter driver responding to the shutter control signal to drive the light shutter,
   wherein every field period is initiated upon a first transition of a gate signal from a low voltage signal to a high voltage signal to apply image data to the pixels and is terminated upon a next transition of the gate signal from a low voltage signal to a high voltage signal to apply image data to the pixel, and wherein every field period corresponds to only one image data value,
   and wherein the light shutter is switched to transmit all light emitted from the liquid crystal display panel at a first transition of the gate signal and the light shutter is switched to shut off the light emitted from the liquid crystal display panel after the first gate signal and before the next transition of the gate signal within the field period.

8. The apparatus according to claim 7, wherein the shutter control signal has an inverse polarity after video data having an inverse polarity are applied to the liquid crystal display panel.

9. The apparatus according to claim 7, wherein the shutter control signal is a pulse signal having a first logical value turning on the light shutter and a second logical value turning off the light shutter.

10. The apparatus according to claim 7, further comprising,
    a data driver connected to a plurality of data lines of the liquid crystal display panel to apply video data to the data lines, and
    a gate driver connected to a plurality of gate lines of the liquid crystal display panel to apply a scanning signal to the gate lines.

11. The apparatus according to claim 10, wherein the data driver is connected to the controller that generates the video data and a dot clock and controls the data driver, and the gate driver is connected to the controller that generates a gate start pulse allowing the scanning signal to be sequentially generated and controls the gate driver.

12. The apparatus according to claim 7, wherein the shutter control signal has a first logical value in an initial field interval when video data are applied to the liquid crystal display panel and has a second logical value in a time interval when the video data are maintained at the liquid crystal display panel.

13. A method of driving a liquid crystal display having a light shutter on the liquid crystal display panel, comprising:
    supplying video data to a liquid crystal display panel emitting light and having a pixel for displaying an image, according to a gate signal; and
    opening the light shutter at a first transition of the gate signal from a low voltage signal to a high voltage signal such that the transmittance of the light shutter to all light emitted from the liquid crystal display is substantially zero before opening; and
    pausing the displaying of the image by closing the light shutter after the first transition of the gate signal and before a next transition of the gate signal from a low voltage signal to a high voltage signal per every field period for each pixel such that the transmittance of the light shutter to all light emitted from the liquid crystal display is substantially zero after closing.

14. The method according to claim 13, further comprising:
    applying a shutter control signal having a first logical value in an initial field interval when the video data are applied to the liquid crystal display panel, and a second logical value in a time interval when the video data are maintained at the liquid crystal display panel.

* * * * *